United States Patent Office 3,483,250
Patented Dec. 9, 1969

3,483,250
OXIDATION OF n-BUTANE
Gerald Sugarman, Fort Lee, N.J., assignor to Halcon International, Inc., a corporation of Delaware
No Drawing. Filed July 8, 1966, Ser. No. 563,663
Int. Cl. C07c 51/20, 51/28
U.S. Cl. 260—533   6 Claims The present invention relates to the oxidation of n-butane and, more particularly, it relates to a new catalyst for use in this oxidation.

The oxidation of n-butane is of interest as butane is an inexpensive raw material and its products are of major economic importance. The oxidation of n-butane in both liquid and vapor phase is known. The products are different, however, depending upon whether the oxidation is conducted in liquid or vapor phase. Oxidation in vapor phase produces formaldehyde, methanol, ethanol, formic acid and acetic acid. This oxidation usually takes place at temperatures between 350 and 400° C. The oxidation of n-butane in liquid phase is a more selective reaction yielding primarily acetic acid, methylethylketone, and methyl acetate. This reaction takes place at substantially lower temperatures of from about 100 to 200° C.

It is an object of the present invention to provide a new catalyst for the oxidation of n-butane. Another object is to provide a catalyst for the selective oxidation of n-butane to acetic acid with little by-product formation. Another object is to provide a catalyst which induces as faster and more selective oxidation of n-butane. These and other objects of the present invention will become apparent from the following description.

It has now been found that n-butane may be oxidized in liquid phase with molecular oxygen at elevated temperatures and pressures in the presence of a catalyst comprising vanadium and either iron or cobalt. The use of the catalyst of the present invention provides markedly higher yields of acetic acid than heretofore known catalysts. The oxidation is carried out at temperatures of from about 125° C. to about 200° C. and at pressures of from about 500 p.s.i.g. to about 1200 p.s.i.g. Preferred reaction temperatures are from about 160° C. to about 180° C. and preferred operating pressures are from about 700 p.s.i.g. to about 1000 p.s.i.g.

The ratio of vanadium to either iron or cobalt may vary from about 0.01 to about 100 parts by weight of vanadium to about 1 part by weight of iron or cobalt, preferably a ratio of from about 0.05 to about 20 parts by weight of vanadium to about 1 part by weight of iron or cobalt, and most preferably from about 0.2 to about 5 parts by weight of vanadium to about 1 part by weight of iron or cobalt. The catalyst is employed in quantities of from about 10 to about 1000 parts per million of total charge. The catalyst may be added in any form whereby it will be soluble under the conditions prevalent in the system. Examples of suitable materials are soluble inorganic and organic salts, and metal complexes. Examples of suitable inorganic salts are the oxides, carbonates, chlorides, and sulfates, of vanadium, cobalt and iron. Examples of organic salts are the acetates, octoates, stearates and naphthenates of vanadium, cobalt and iron. As examples of metal complexes there may be mentioned the acetyl acetonates of vanadium, cobalt and iron.

The oxidation is carried out in the presence of a solvent, preferably acetic acid. The ratio of n-butane to acetic acid is not critical as the two materials are mutually soluble. Generally, an increase of the weight fraction of n-butane in the liquid phase leads to a decrease in n-butane conversion. At the same time the yield of useful products is increased. An n-butane acetic acid ratio of 0.3:1.0 is associated with a good conversion of n-butane and a high yield of acetic acid.

The following examples illustrate the present invention without however limiting the same thereto.

The procedure used in Examples 1 and 2 (continuous runs) is as follows:

Butane feed tanks are loaded with 3600 g. of liquified C.P. n-butane, 7.2 g. of methylethylketone and sufficient 3 to 5% Va and Co naphthenates to give 100 p.p.m. of each metal. The autoclave is charged with 850–900 g. of glacial acetic acid, sealed and heated to 170° under either 760 or 1000 p.s.i.g. Air (not saturated with n-butane) is fed from a cylinder manifold into the autoclave. Air input and butane feed is started simultaneously. Vent gas oxygen is monitored semi-continuously, feed pump rate and gas flow are adjusted to desired levels and ratios. Accumulated liquid products are removed from the pot via a hand-operated micrometer control valve which is set so as to maintain constant level in a sight glass across the autoclave. Liquid effluent is fed continuously to a 10-plate Snyder column with a Dry-Ice acetone cooled condenser wherein n-butane is topped continuously to a pot temperature of 40° C. After 2.5 kg. of liquid product has accumulated in the stillpot under constant operating conditions, both stillpot and n-butane recovery flasks are drained and an equilibrium run is made under these conditions for 1 hour. During the equilibrium run a monitored slipstream of chilled vent gas is run through an analytical train consisting of an oxygen enricher, hopcalite, Drierite, ascarite and Drierite tubes in series. From the increase in weight of the ascarite the carbon oxide make can be determined. Any gain in weight of the first Drierite tube (usually negligible) is taken as indicating the presence of low boiling by-products in the vent gas and is corrected for. Effluent obtained during the equilibrium run is topped and the topped effluent and overhead butane are analyzed for carbon, total acid, and formic acid-formate, the latter by mercuric acetate oxidation. Acetic acid is taken as the difference between total acid and formic acid-formate calculated as formic acid. All selectivities in these examples are expressed on a carbon basis.

TABLE 1

| Example | Butane Conversion, percent | Percent Butane in effluent | Select. to Acetic Acid, percent | Select. to Oxides of Carbon, percent | Select. to formic acid formate as formic acid, percent |
|---|---|---|---|---|---|
| 1 | 63 | 22 | 65 | 6 | 1.6 |
| 2 | 86 | 5.8 | 70 | 4 | 1.7 |

The procedure used in Examples 3–7 (batch runs) is as follows:

The equipment used was the same as that in the foregoing examples except that the input air was presaturated with butane, the feed pump, liquid and sight glass were disconnected and chilled water replaced Dry-Ice Cellosolve-acetone in the secondary condenser.

About 400 grams of butane, 500 grams of acetic acid, 2.0 grams of methylethylketone and 80 mg. of indicated metal catalysts as naphthenate are charged to an autoclave, which is sealed, pressured to 1000 p.s.i.g. and heated to 170° C. Air saturated with butane is passed into the autoclave via a sparger and the off-gas monitored. Air is fed at a rate to provide oxygen breakthrough. When oxygen absorption has essentially ceased, the oxidation is quenched and the pot contents analyzed after topping butane.

TABLE 2

| Example | Select. to HOAc | Select. to formic acid | Select. to CO+$CO_2$ | Mmol $O_2$ abs. per mol $C_4$ per min. | Catalyst |
|---|---|---|---|---|---|
| 3 | 43 | 7 | 3 | $9 \times 10^2$ | V, Fe |
| 4 | 34 | 3 | 1 | $1.2 \times 10^2$ | V, Co |
| 5 | 17 | 6 | 41 | $1.0 \times 10^2$ | V, Mo |
| 6 | 14 | 8 | 0.2 | 55 | V, Ni |
| 7 | 1 | 8 | 34 | $6.5 \times 10^2$ | V, Cr |
| 8 | 12 | 3.0 | 21 | | V |
| 9 | (¹) | | | | V, Mn |
| 10 | 21 | 3.3 | 27 | | Co |
| 11 | −16 | | | | V, $H_3PO_4$ |
| 12 | −5 | | | | V, Hg |

¹ No reaction.

The foregoing table shows the unique advantages obtained by the catalyst of the present invention compared with other catalysts and combinations of catalysts.

Due to the formation of intermediates which are slowly converted to acetic acid, single stage batch selectivities do not always show the greatly improved results obtainable with this catalyst.

I claim:

1. A process for preparing acetic acid which comprises contacting a liquid mixture containing n-butane, methyl-ethyl ketone, and acetic acid with molecularoxygen at temperatures of from about 125° C. to about 200° C. and pressures of from about 500–1200 p.s.i.g. in the presence of a catalyst consisting essentially of vanadium and a second metal selected from the group consisting of iron and cobalt, the ratio of vanadium to the second metal being from about 0.2 to about 5 parts of vanadium to about 1 part of the second metal.

2. A process according to claim 1 wherein the temperature is from about 160° C. to about 180° C.

3. A process according to claim 1 wherein the pressure is from about 700 p.s.i.g. to about 1000 p.s.i.g.

4. A process according to claim 1 wherein the catalyst is added in the form of a soluble compound.

5. A process according to claim 4 wherein the catalyst is present in a quantity of from about 10 p.p.m. to about 1000 p.p.m.

6. The process according to claim 5 wherein the temperature is from about 160° C. to about 180° C. and wherein the pressures are from about 700 p.s.i.g. to about 1000 p.s.i.g.

References Cited

UNITED STATES PATENTS 2,265,948  10/1941  Loder _____ 200—597 X
2,825,740  3/1958  Armstrong et al. _____ 260—533

FOREIGN PATENTS 771,991  4/1957  Great Britain.

LORRAINE A. WEINBERGER, Primary Examiner

D. STENZEL, Assistant Examiner

U.S. Cl. X.R.
252—431, 472